US012034131B2

(12) United States Patent
Wood, Sr. et al.

(10) Patent No.: US 12,034,131 B2
(45) Date of Patent: Jul. 9, 2024

(54) STAND-BY POWER MODULE FOR VEHICLE ENGINE

(71) Applicant: Systematic Power Manufacturing, LLC, Knoxville, TN (US)

(72) Inventors: Robert J. Wood, Sr., Oneonta, NY (US); Chad E. Hall, Oneonta, NY (US); Bryce Gregory, Port Crane, NY (US); Luke Yetto, Walton, NY (US); Daniel A. Patsos, Canajoharie, NY (US); Joseph Agrelo, Ballston Spa, NY (US)

(73) Assignee: Systematic Power Manufacturing, LLC, Knoxville, TN (US)

( * ) Notice: Subject to any disclaimer, the term of this patent is extended or adjusted under 35 U.S.C. 154(b) by 223 days.

(21) Appl. No.: 17/832,588

(22) Filed: Jun. 4, 2022

(65) Prior Publication Data
US 2022/0399581 A1 Dec. 15, 2022

Related U.S. Application Data

(63) Continuation-in-part of application No. 17/379,473, filed on Jul. 19, 2021, now Pat. No. 11,479,080.
(Continued)

(51) Int. Cl.
*H01M 10/42* (2006.01)
*H02J 7/34* (2006.01)
(Continued)

(52) U.S. Cl.
CPC ......... *H01M 10/4264* (2013.01); *H02J 7/345* (2013.01); *H02J 50/40* (2016.02);
(Continued)

(58) Field of Classification Search
CPC ......... H01M 10/4264; H01M 2220/20; H01M 10/425; H01M 2010/4278; H02J 7/345;
(Continued)

(56) References Cited

U.S. PATENT DOCUMENTS

| 5,710,699 A | 1/1998 | King et al. |
| 6,476,586 B2 | 11/2002 | Yunosawa et al. |

(Continued)

FOREIGN PATENT DOCUMENTS

| CN | 205178537 U | 4/2016 |
| CN | 106100091 A | 11/2016 |

OTHER PUBLICATIONS

International Search Report and Written Opinion issued in PCT/US22/33052; issued Sep. 23, 2022; 9 pages.
(Continued)

*Primary Examiner* — Jared Fureman
*Assistant Examiner* — Michael J Warmflash
(74) *Attorney, Agent, or Firm* — Peter L. Brewer; Thrive IP

(57) ABSTRACT

A portable hybrid power module is provided. The power module represents a combined capacitor and battery residing together in a single housing. The battery is preferably a 12 volt DC gel cell battery while the capacitor is an ultracapacitor residing in parallel with the battery. The ultracapacitor may be a series of 6 to 12 super capacitors residing in series, with each super capacitor providing 2.5 volts DC charge. The hybrid power module is configured to provide a charge to start an external portable device. The device may be an all-terrain vehicle, a personal water craft, a generator set, or a vehicle. The power module includes a first device terminal and a second device terminal for establishing electrical communication with a battery of the external portable device.

13 Claims, 3 Drawing Sheets

Related U.S. Application Data

(60) Provisional application No. 63/209,887, filed on Jun. 11, 2021, provisional application No. 63/209,848, filed on Jun. 11, 2021, provisional application No. 63/209,879, filed on Jun. 11, 2021.

(51) Int. Cl.
*H02J 50/40* (2016.01)
*H02J 50/60* (2016.01)
*H02J 7/00* (2006.01)

(52) U.S. Cl.
CPC ......... *H02J 50/60* (2016.02); *H01M 2220/20* (2013.01); *H02J 7/0013* (2013.01); *H02J 2207/50* (2020.01)

(58) Field of Classification Search
CPC .......... H02J 50/40; H02J 50/60; H02J 7/0013; H02J 2207/50; H02J 7/0016; H02J 7/0069; H02J 7/342; H02J 2310/48; H02J 1/122; Y02E 60/10; Y02E 60/13; Y02T 10/88; Y02T 10/70; H01G 11/82; H01G 11/08; H01G 11/10; B60H 1/3232; B60H 1/00428
See application file for complete search history.

(56) References Cited

U.S. PATENT DOCUMENTS

| | | |
|---|---|---|
| 6,518,733 B1 | 2/2003 | Schenkel et al. |
| 6,765,312 B1 | 7/2004 | Urlass et al. |
| 6,799,070 B2 | 9/2004 | Wolfe et al. |
| 7,077,209 B2 | 7/2006 | McCulloch et al. |
| 7,119,518 B1 | 10/2006 | Dougherty et al. |
| 7,193,390 B2 | 3/2007 | Nagai et al. |
| 7,362,005 B2 | 4/2008 | Leblanc |
| 7,548,409 B2 | 6/2009 | Kojima et al. |
| 7,628,028 B2 | 12/2009 | Tolbert, Jr. et al. |
| 7,633,271 B2 | 12/2009 | Schulte et al. |
| 7,667,432 B2 | 2/2010 | West et al. |
| 7,782,016 B2 | 8/2010 | Kang et al. |
| 7,887,943 B2 | 2/2011 | Yoshikane et al. |
| 7,944,080 B2 | 5/2011 | Ishizeki |
| 7,946,123 B2 | 5/2011 | Tolbert, Jr. et al. |
| 8,264,333 B2 | 9/2012 | Blaker et al. |
| 8,305,733 B2 | 11/2012 | Chan et al. |
| 8,314,578 B2 | 11/2012 | Namuduri et al. |
| 8,379,367 B2 | 2/2013 | Oh et al. |
| 8,519,821 B2 | 8/2013 | Ablabutyan |
| 8,655,574 B2 | 2/2014 | Izumoto et al. |
| 8,751,116 B2 | 6/2014 | Bark et al. |
| 8,792,224 B2 | 7/2014 | Kim et al. |
| 8,798,871 B2 | 8/2014 | Lugash et al. |
| 8,860,244 B2 | 10/2014 | Hattori |
| 8,886,425 B2 | 11/2014 | Doering et al. |
| 9,272,627 B2 | 3/2016 | Miller |
| 9,300,018 B2 | 3/2016 | Watson et al. |
| 9,415,690 B2 | 8/2016 | Ferrer-Dalmau Nieto et al. |
| 9,562,715 B2 | 2/2017 | Kandasamy |
| 9,616,796 B2 | 4/2017 | Russo et al. |
| 9,627,908 B2 | 4/2017 | Kaminsky et al. |
| 9,666,860 B2 | 5/2017 | Lam et al. |
| D792,847 S | 7/2017 | Stone et al. |
| 9,803,609 B2 | 10/2017 | Setterberg et al. |
| 9,833,223 B2 | 12/2017 | Wood et al. |
| 9,892,868 B2 | 2/2018 | Pyzza et al. |
| 9,899,643 B2 | 2/2018 | Pyzza et al. |
| 9,911,541 B2 | 3/2018 | Wang et al. |
| 9,991,060 B2 | 6/2018 | Bouchard et al. |
| 10,000,125 B2 | 6/2018 | Choi |
| 10,023,065 B2 | 7/2018 | Huang et al. |
| 10,024,408 B2 | 7/2018 | Johnson |
| 10,029,572 B2 | 7/2018 | Sakatani et al. |
| 10,065,523 B2 | 9/2018 | Wood et al. |
| 10,119,514 B2 | 11/2018 | Averbukh et al. |
| 10,153,096 B2 | 12/2018 | Xi et al. |
| 10,158,152 B2 | 12/2018 | Watson et al. |
| D840,340 S | 2/2019 | Suszko et al. |
| 10,240,847 B1 | 3/2019 | Thomas, Jr. |
| 10,242,808 B2 | 3/2019 | Eilertsen et al. |
| 10,278,681 B2 | 5/2019 | Wood et al. |
| 10,297,572 B2 | 5/2019 | Dalal et al. |
| 10,297,885 B2 | 5/2019 | Gayden et al. |
| 10,319,536 B1 | 6/2019 | Achrekar |
| 10,523,019 B2* | 12/2019 | Rohera ............... H01M 16/003 |
| 10,551,104 B2 | 2/2020 | Kandasamy |
| 10,596,913 B2 | 3/2020 | Healy et al. |
| 10,654,369 B2 | 5/2020 | Healy |
| 10,668,825 B2* | 6/2020 | Wood ...................... B60L 50/40 |
| 10,668,831 B2 | 6/2020 | Hudson |
| 10,710,525 B2 | 7/2020 | Pierce et al. |
| 10,723,182 B2 | 7/2020 | Lesesky et al. |
| 10,744,888 B2 | 8/2020 | Healy et al. |
| 10,821,853 B2* | 11/2020 | Healy .................. B60W 20/12 |
| 10,967,742 B2 | 4/2021 | Healy |
| 10,981,487 B1 | 4/2021 | Russo |
| 11,046,192 B2* | 6/2021 | Aufdencamp .......... B60L 50/60 |
| 11,069,488 B2* | 7/2021 | Johnson ................ H01G 11/86 |
| 11,165,266 B2 | 11/2021 | Johnson et al. |
| 11,255,276 B2 | 2/2022 | Cohn et al. |
| 11,273,716 B2 | 3/2022 | Matsuda et al. |
| 11,281,982 B2 | 3/2022 | Cristache |
| 11,293,394 B2 | 4/2022 | Banerjee et al. |
| 11,303,139 B2 | 4/2022 | Hinterberger et al. |
| 11,303,980 B2 | 4/2022 | Chng et al. |
| 2003/0151875 A1 | 8/2003 | Nguyen et al. |
| 2006/0005739 A1 | 1/2006 | Kumar |
| 2007/0047100 A1 | 3/2007 | Takahashi et al. |
| 2007/0132313 A1 | 6/2007 | Baeuerle |
| 2008/0268330 A1* | 10/2008 | Hansen ................ H01M 10/02 |
| | | 429/97 |
| 2009/0091291 A1 | 4/2009 | Woody et al. |
| 2009/0133419 A1 | 5/2009 | Matsuno et al. |
| 2009/0266091 A1 | 10/2009 | Tolbert, Jr. |
| 2009/0314561 A1 | 12/2009 | Handa |
| 2010/0079109 A1 | 4/2010 | Eilertsen et al. |
| 2010/0148582 A1 | 6/2010 | Carter |
| 2010/0275628 A1 | 11/2010 | Moseley |
| 2010/0292877 A1* | 11/2010 | Lee ....................... B60L 50/66 |
| | | 180/68.5 |
| 2011/0030414 A1 | 2/2011 | Newell et al. |
| 2011/0218698 A1 | 9/2011 | Bissontz |
| 2011/0288738 A1 | 11/2011 | Donnelly et al. |
| 2012/0049638 A1 | 3/2012 | Dorn et al. |
| 2012/0235473 A1 | 9/2012 | Jiang et al. |
| 2012/0237799 A1* | 9/2012 | Jiang ........................ B60L 3/04 |
| | | 429/7 |
| 2012/0301750 A1 | 11/2012 | Reis et al. |
| 2013/0031318 A1 | 1/2013 | Chen et al. |
| 2013/0248165 A1 | 9/2013 | Kandasamy |
| 2013/0248615 A1 | 9/2013 | Yeates |
| 2013/0264875 A1 | 10/2013 | Kaminsky et al. |
| 2013/0266824 A1 | 10/2013 | Cowperthwaite et al. |
| 2013/0266826 A1* | 10/2013 | Cowperthwaite ... H01M 50/209 |
| | | 29/25.42 |
| 2014/0041179 A1 | 2/2014 | Bradley et al. |
| 2014/0136055 A1 | 5/2014 | Sugiyama et al. |
| 2015/0240939 A1 | 8/2015 | Ge |
| 2015/0246593 A1 | 9/2015 | Larson et al. |
| 2016/0176298 A1 | 6/2016 | Watson et al. |
| 2016/0243960 A1 | 8/2016 | Wood et al. |
| 2016/0327007 A1 | 11/2016 | Averbukh et al. |
| 2017/0063104 A1 | 3/2017 | Bean |
| 2017/0194903 A1 | 7/2017 | Herbert |
| 2017/0250547 A1* | 8/2017 | Menze ................... H02J 7/0024 |
| 2018/0013112 A1* | 1/2018 | Cameron ............ F02N 11/0866 |
| 2018/0249517 A1 | 8/2018 | Park et al. |
| 2018/0337544 A1* | 11/2018 | Liao ...................... H01M 50/204 |
| 2018/0337550 A1* | 11/2018 | Agrelo .................. H01G 11/22 |
| 2019/0061555 A1 | 2/2019 | Liu et al. |
| 2019/0067754 A1 | 2/2019 | Gu et al. |

(56) References Cited

U.S. PATENT DOCUMENTS

2020/0127479 A1* 4/2020 Johnson .................... H02J 7/00
2021/0012975 A1 1/2021 Su et al.
2021/0151809 A1 5/2021 Kong et al.

OTHER PUBLICATIONS

Translation of CN 205178537 U; Published Apr. 20, 2016; 7 pages.
Translation of CN 106100091 A; Published Nov. 9, 2016; 4 pages.

* cited by examiner

STAND-BY POWER MODULE FOR VEHICLE ENGINE

STATEMENT OF RELATED APPLICATIONS

This application claims the benefit of U.S. Ser. No. 63/209,879 filed Jun. 11, 2021. That application is entitled "Stand-By Engine Starting Module."

This application also claims the benefit of U.S. Ser. No. 63/209,848 filed Jun. 11, 2021. That application is entitled "Super Capacitor Based Cooling System Module."

This application is also filed as a Continuation-in-Part of U.S. Ser. No. 17/379,473 filed Jul. 19, 2021. That application is entitled "Hybrid Energy Power Module for Mobile Electrical Devices."

The '473 application was filed as a Continuation-in-Part of U.S. Ser. No. 16/352,555 filed Mar. 13, 2019. That application is entitled "Hybrid Super-Capacitor and Battery."

Each of these applications is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce selected aspects of the art, which may be associated with various embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of power generation for remote locations. More specifically, the present invention relates to a portable hybrid power generator that may be used to start engines that have otherwise lost cranking power.

DISCUSSION OF TECHNOLOGY

Almost all vehicles and other mobile transportation devices rely on lead acid batteries. Lead acid batteries, or so-called acid-cell batteries, lose charge over time. This is particularly true when the battery is exposed to cold temperatures in an idle condition.

All vehicles that are powered by an internal combustion engine rely on some version of a lead acid battery. Such batteries utilize two electrical terminals, referred to as "electrodes." The electrodes are separated by a chemical substance called an electrolyte. Electrical energy is released in response to a chemical reaction involving the electrodes and the electrolyte. Once the chemicals have been depleted, the reactions stop and the battery is no longer able to provide a charge to start the engine.

Depending on size, batteries can hold large amounts of power. At the same time, lead acid batteries lose charge over time. This is particularly true when the battery is exposed to cold temperatures or sits idle for an extended period of time. In addition, lead acid batteries have a limited number of crank cycles, sometimes less than 1,000 cycles. This is a particular problem for delivery vehicles that make multiple curbside stops.

Ultimately, almost every lead acid battery will need to be jump-started or replaced in order to start a combustible engine.

It is known to use a portable charging battery, otherwise known as a charging bank, to attempt to restart an engine on a vehicle or device that has a weak battery. Various jump starter products are available which utilize an internal battery along with external jumper cables. Clamps are provided with the jumper cables for attachment to the battery terminals of a standard vehicle's direct current (DC) electrical system. Some portable jump starters may incorporate an electrical power inverter (for supplying Alternating Current (AC) power). However, these batteries too need to be recharged and, recharging batteries is notoriously slow.

Therefore, a need exists for a hybrid power module that incorporates both a battery and a bank of super capacitors into a portable charging unit. A need further exists for a portable, or stand-by engine starting module, that may be maintained on a trickle charger for a moment of need.

SUMMARY OF THE INVENTION

A portable hybrid power module is provided herein. The hybrid power module represents a combined capacitor and battery, in modular form. To this end, the hybrid power module first comprises a housing.

The power module includes a battery residing within the housing. The power module also includes an ultra-capacitor that also resides within the housing. The ultra-capacitor is in electrical communication with the battery.

The battery is preferably a gel cell battery. The battery may be a 12 volt DC battery.

The ultra-capacitor is preferably a series of super capacitors. In one embodiment, a Zener diode is placed across each super capacitor, forming an active voltage clamp type balance circuit. The Zener diode clamp limits the maximum voltage that each super capacitor sees during charging. This keeps the super capacitor cells balanced, healthy and equally sharing the load by minimizing any chance of overcharging. Preferably, each super capacitor provides 2.5 volts DC charge.

The hybrid power module is configured to provide a charge to start an external portable device. The device may be an all-terrain vehicle, a personal water craft, a generator set, or a vehicle. The vehicle may be, for example, a car, a truck, or even a class-07 or class-08 semi-cab. To accommodate this functionality, the power module comprises two terminals associated with the housing. The terminals represent a first device terminal and a second device terminal, with the terminals being configured to be placed in electrical communication with a battery associated with the external portable device.

Preferably, the battery is connected between the first device terminal and the second device terminal, while the capacitor is connected in parallel with the battery.

In one aspect, each of the first device terminal and the second device terminal represents a standard SAE terminal. The power module may further comprise a trickle charger, with the trickle charger being configured to be connected to the first device terminal and the second device terminal to provide maintenance charge to the hybrid power module.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 1:
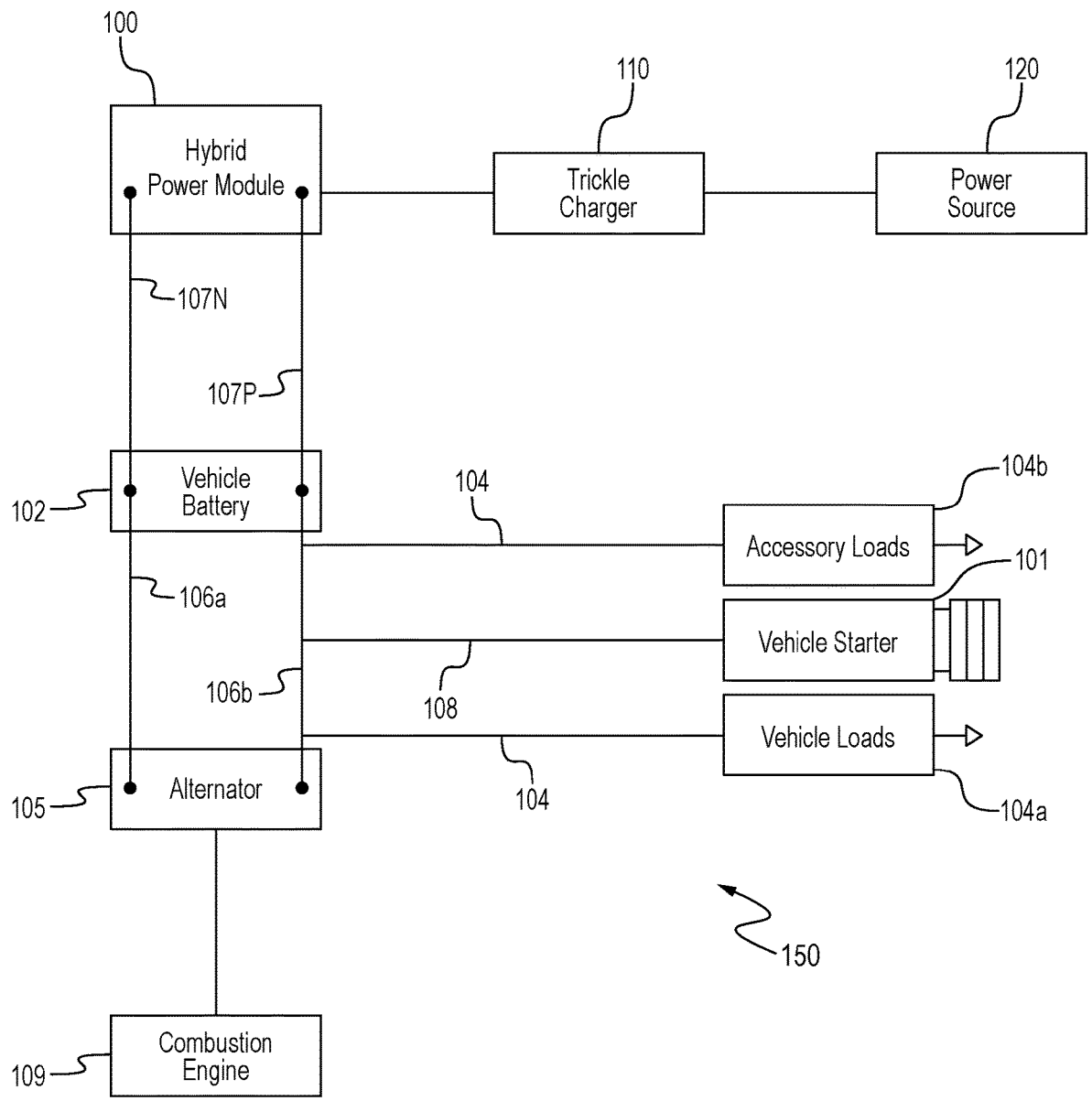
FIG. 1 is a diagram illustrating an electrical system for a portable device having an internal combustion engine, in one example. The illustrative portable device is a vehicle having a vehicle battery, an alternator, and the combustible engine. A portable hybrid power module is shown schematically, connected to the vehicle battery.

FIG. 1 is a diagram illustrating an electrical system for a portable device 150. The illustrative portable device 150 is a vehicle. The vehicle 150 may be, for example, a car or a truck. The vehicle 150 may be a commercial vehicle such as a class-07 or class-08 semi-cab, or may be a commercial boat. In alternative embodiments, the vehicle 150 may represent an all-terrain vehicle (or so-called four wheeler, or ATV), a motorcycle, or a jet ski.

In any instance, the vehicle 150 includes a vehicle battery 102 and a vehicle alternator 105. The battery 102 is in electrical communication with the alternator 105 by means of wires 106. These may be a negative DC bus 106a and a positive DC bus 106b. In some cases, the vehicle 150 may have more than one battery 102, with the batteries being connected to the alternator 105 in parallel.

Cables 104 extend from the vehicle battery 102 as part of a DC bus, or wiring harness. The cables 104 send electrical energy to support vehicle loads 104a and accessory loads 104b. The term vehicle loads 104a generally refers to the hotel load internal to the vehicle 150, while the term accessory load 104b generally refers to external loads that may be carried by the vehicle 150 such as lighting for a trailer or aftermarket parts.

In operation, the vehicle battery 102 sends a charge to a vehicle starter 101 in order to crank a combustion engine 109. Cable 108 is illustrative of a part of the DC bus used to convey charge from the starter 101. Thereafter, energy from the battery 102 and the alternator 105 support the vehicle loads 104a and accessory loads 104b.

In the view of FIG. 1, the vehicle 150 is connected to a power module 100. The power module 100 is designed to assist in starting the vehicle 150. Specifically, the power module 100 is used to start the combustion engine 109 of the vehicle 150 in the event the vehicle battery 102 does not itself have sufficient charge for the job, i.e., becomes weak or even dead.

It is noted that after the vehicle 150 is started, the alternator 105 assumes the primary role as the provider of electrical energy to the vehicle loads 104a. Specifically, the alternator 105 powers the vehicle's 150 electronic components while the vehicle 150 is being driven, and even while it is idling. This includes the headlights, power steering, power windows, windshield wipers, heated seats, dashboard instruments, and radio. The alternator 105 turns mechanical energy into direct current (DC) power. Of interest, the alternator 105 is also responsible for charging (or maintaining charge for) the vehicle battery 102 while driving. However, the alternator 105 is of no benefit if the vehicle 150 cannot be started in the first place as the alternator's mechanical energy is derived from the engine's drive belt.

In the illustrative arrangement of FIG. 1, the power module 100 is in electrical communication with the vehicle battery 102. This is done using positive 107P and negative 107N cables. The cables 107 may be lengthy, extending up to 100 feet.

The power module 100 is connected to a trickle charger 110. The trickle charger 110 provides maintenance charge to the power module 100. The trickle charger 110, in turn, is configured to be connected to a power source 120. The power source 120 may be a 110-volt outlet, a 220-volt outlet, or other outlet connected to the power grid.

It is understood that the power module 100 is portable. In this respect, it may ride on a dolly, on an electric cart, or in the back of a separate truck. The power module 100 serves as an energy module, and specifically may be used to provide charge to the vehicle 150 in the event the vehicle battery 102 loses power. Beneficially, the hybrid power module 100 may be used to re-charge the battery of a stranded electric vehicle.

Figure 2:
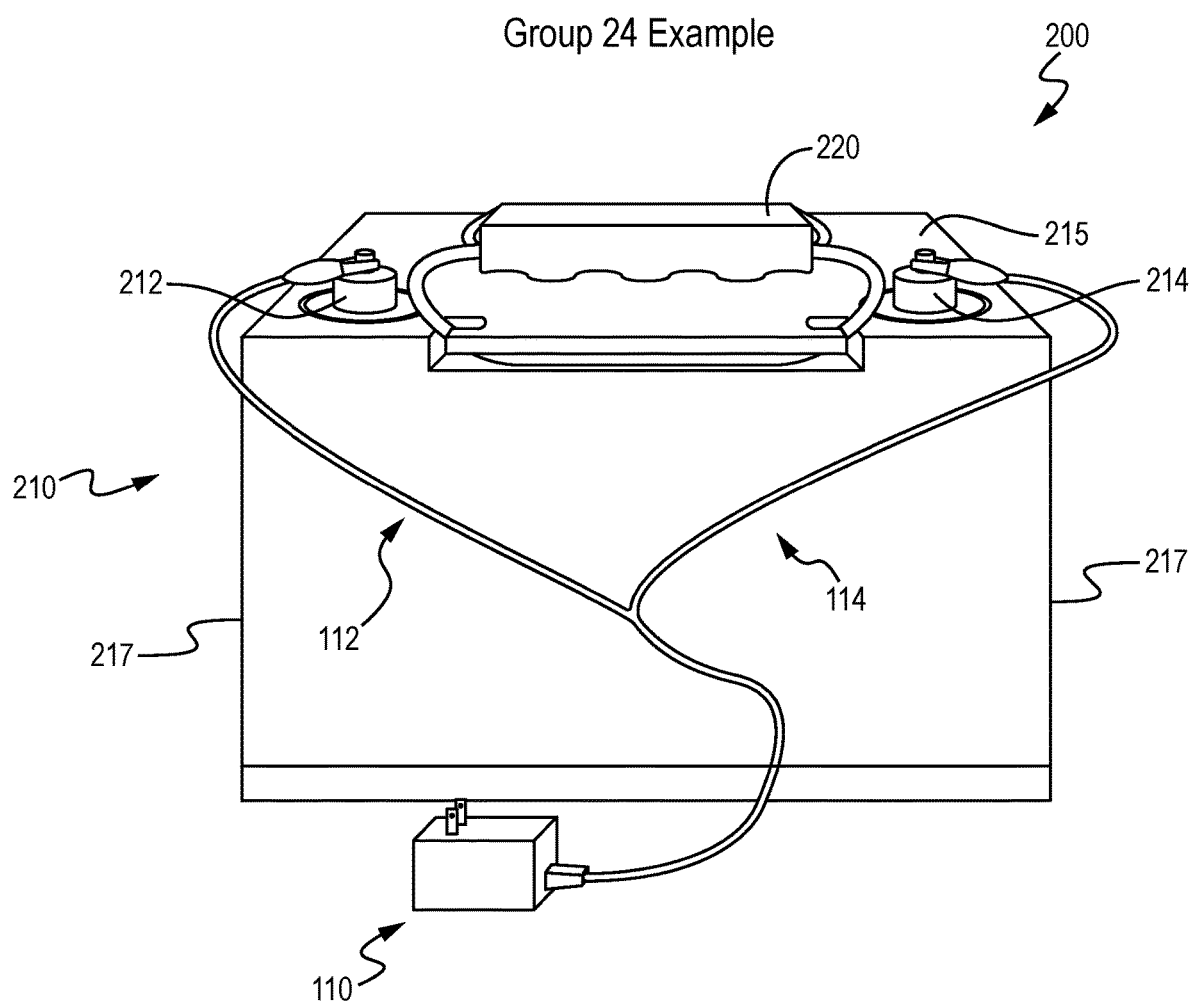
FIG. 2 is a perspective view of a portable hybrid power module of the present invention, in one embodiment. The hybrid power module represents a combined capacitor and battery, wherein each of the capacitor and the battery reside in a single housing.

FIG. 2 is a perspective view of a portable hybrid power module 200 of the present invention, in one embodiment. The power module 200 may be referred to as an engine starting module, and represents one arrangement for the hybrid power module 100 of FIG. 1. The engine starting module 200 comprises a combined capacitor and battery, wherein each of the capacitor and the battery reside in a single housing 210.

Batteries and capacitors are both used for storing electrical charge. However, they operate in different ways.

Batteries utilize two electrical terminals, referred to as "electrodes." The electrodes are separated by a chemical substance called an electrolyte. Electrical energy is released in response to a chemical reaction involving the electrodes and the electrolyte. Once the chemicals have been depleted, the reactions stop and the battery is no longer able to provide a charge.

Some batteries are rechargeable. A well-known example is the lithium-ion power pack used for laptop computers and small, portable electronic devices. In these batteries, the electricity-inducing reactions run between the terminals in either direction. The result is that the battery can be charged and discharged hundreds of times before replacing. Of interest, most electric vehicles now run on energy provided by lithium-ion batteries.

Lead acid batteries are frequently used in cars, trucks, boats, jet skis and other mobile units as a way of providing the initial starting charge for an internal combustion engine. For electrical cars and motorcycles, batteries provide ongoing power to turn a shaft and to power electrical devices (such as a radio or sensor). Batteries can also be used to provide power for portable refrigeration units such as those found in rail cars and over-the-road trailers. The larger the charge that is needed, the larger the battery (measured in kilo-watts).

Depending on size, batteries can hold large amounts of power. At the same time, they can take many hours to re-charge. For example, batteries used for electric motorcycles typically take 4 to 7 hours to re-charge. Batteries used for electric vehicles can also take just as long, depending on the size of the battery, the state of the battery and the voltage of the power source being used.

Capacitors, on the other hand, can be charged almost instantly. Capacitors weigh less than batteries and typically do not contain chemicals or toxic metals. The downside though is that capacitors can store only small amounts of power.

Capacitors use static electricity (or electrostatics) rather than chemistry to store energy. A capacitor utilizes two opposing conducting metal plates with an insulating material there between. The insulating material is referred to as a dielectric. Positive and negative electrical charges build up on the plates, preventing them from coming into contact. The dielectric allows a capacitor of a certain size to store more charge at the same voltage.

Some capacitators are referred to as super-capacitors. A super-capacitor (or ultra-capacitor) differs from an ordinary capacitor in that its plates effectively have a much bigger surface area and the distance between them is much smaller. In the case of a super-capacitor, the plates are made from a metal coated with a porous substance such as powdery, activated charcoal. The porosity provides the greater surface area for storing more charge, providing more electrical capacitance (measured in Farads). Also of interest, in a super-capacitor there is no dielectric material per se; instead, both plates are soaked in an electrolyte and separated by a very thin insulator.

When the plates are charged, an opposite charge forms on either side of the insulator, creating what is called an electric double-layer. The double-layer is extremely thin, perhaps only one molecule thick (compared to a dielectric that might range in thickness from a few microns to a millimeter or more in a conventional capacitor). For this reason, super-capacitors are sometimes referred to as double-layer capacitors, or electric double-layer capacitors ("EDLC's").

The capacitance of a capacitor increases as the area of the opposing plates increases, and also as the distance between the plates decreases. Capacitors have many advantages over batteries. As noted above, they generally weigh less. They can also be charged and discharged hundreds of thousands of times without wearing out. However, by design they are unable to store a charge in the same way as batteries. Thus, it would be advantageous to combine a bank of super capacitors with a battery to form a stand-by power module.

Figure 3:
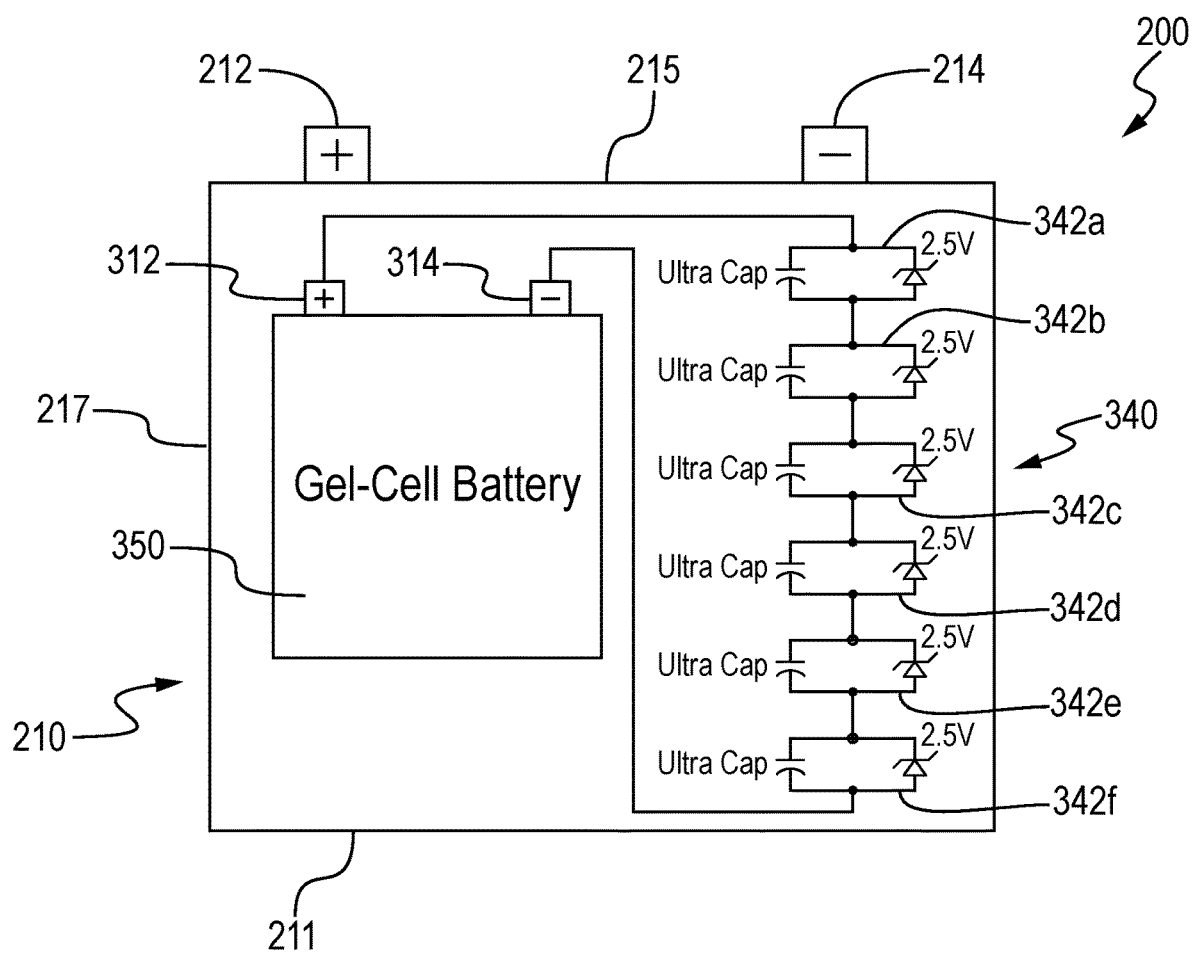
FIG. 3 is a diagram showing the architecture of the engine starting module of FIG. 2, in one embodiment.

Returning to FIG. 2, the housing 210 may comprise a base and a cap (shown at 211 and 215 in FIG. 3, respectively). The housing 210 may also have side walls 217. In the illustrative arrangement of FIG. 2, the engine starting module 200 may be carried by hand. Handle 220 is provided, connected to the housing 210. However, it is understood that the engine starting module 200 may be larger, and may require use of a hand truck, an electric cart, or even a separate truck bed for carrying.

The engine starting module (or hybrid power module) 200 shown in FIG. 2 is designed to be a so-called Group 24 energy storage device. The term Group 24 refers to dimensions, which are 10.25×6.8125×8.875 inches. Of course, the module 200 may be a Group 21, a Group 27, a Group 31, a Group 34, or other energy storage device having different dimensions.

As noted in FIG. 1, the engine starting module 200 may be connected to a trickle charger 110. A trickle charger 110 is seen in FIG. 2. The trickle charger 110 includes conductive wires 112, 114 that connect to terminals (or electrodes) 212, 214, respectively. The trickle charger 110 provides maintenance charge to the ultra-capacitor and the battery residing within the housing 210.

FIG. 3 is a diagram illustrating architecture for the power module 200, in one embodiment. The housing 210 of the power module 100 is seen, with the architecting residing therein. The architecture includes both an ultra-capacitor 340 and a battery 350.

The ultra-capacitor 340 is preferably a series of individual super capacitors. In the arrangement of FIG. 3, six super capacitors $342a, \ldots 342f$ are provided in series. A diode, such as a Zener diode, is placed across each super capacitor $342a, \ldots 342f$, forming an active voltage clamp type balance circuit. Preferably, each super capacitor $342a, \ldots 342f$ provides 2.5 volts DC charge. Preferably, 6 to 12 super capacitors $342a, \ldots 342f$ are provided, in series within the housing 210.

When fully charged by the trickle charger 110 (or other power pack), the bank of super capacitors $342a, \ldots 342f$ may put out 36,000 joules of starting energy (G24, G27). A larger size power module 200 (G31, G34) may put out 72,000 joules of starting energy.

The ultra-capacitor 340 resides in parallel with the battery 350 within the housing 210. The battery 350 is preferably a 12 volt DC gel cell battery at 10 Amp-Hr. (Group 21) or 12 Amp-Hr. (Group 24).

As demonstrated in FIG. 1, the hybrid power module 100 is configured to provide a charge to start an external portable device 150. The device 150 may be an all-terrain vehicle, a personal water craft, a generator set, or a vehicle. The vehicle may be, for example, a car, a truck, or even a class-07 or class-08 semi-cab. To accommodate this functionality, the power module 100 comprises two terminals associated with the housing 210. The terminals represent a first device terminal 212 and a second device terminal 214. The terminals 212, 214 are configured to be placed in electrical communication with the battery 102 for the external portable device 150.

In one aspect, each of the first device terminal 212 and the second device terminal 214 represents a standard SAE terminal. Preferably, the battery 350 is connected between the first device terminal 212 and the second device terminal 214, while the ultra-capacitor 340 is connected in parallel with the battery 350.

Components of the power module 200 may be solid state. As understood in the art of electronics, solid-state components, including field-effect transistors (FETs) and insulated gate bipolar transistors (IGBT), tend to be faster, more reliable, and consume less power than relays and contactors.

In one aspect, current supplied to the vehicle battery 102 from the hybrid power module 200 will be generated proportionally from both the super capacitors $342a, \ldots 342f$ and the battery 350. Additionally, because current can flow between the super capacitors $342a, \ldots 342f$ and the battery 350, the available charge and voltage of the super capacitors $342a, \ldots 342f$ will also generally move towards a charge and voltage equilibrium relative to that of the battery 350.

In one aspect, the bulk of the power generation for starting the external portable device will come from the super capacitors $342a, \ldots 342f$. This is due to their innate low equivalent series resistance (ESR). While the parallel battery 350 supports the long term ability to hold the charge voltage on the capacitors 340, even after repetitive attempts and long durations before recharge, it also assists in supporting starting current.

In a less preferred arrangement, the architecture for the power module 200 includes a rectifier. The rectifier is connected between the first device terminal 212 of the battery and the ultra-capacitor 340, with the rectifier being configured to provide unidirectional current flow from the first device terminal 212 to the ultra-capacitor 340. In another aspect, the power module further comprises a third device terminal. Here, the rectifier is connected between the third device terminal and the ultra-capacitor 340.

There are multiple advantages to the hybrid engine start module 200 described herein. For example, the power module 200 offers a wide operating temperature range of −40 to +65° C. The power module 200 is RoHs compliant, and is integrated and sealed. It utilizes a standard 2-terminal interface with SAE terminals and will not degrade even if left on a float charge continuously for months. The architecture of the power module 200 is less sensitive to vibration than traditional wet cell batteries, and is maintenance free.

The power module 200 may be quickly charged during short intervals over a nearly indefinite time frame. The power module 200 configuration using an integrated ultra-capacitor 340 and GEL cell battery module 350 offers maximum intermittent starting reliability. The module 200 is capable of long life while experiencing both deep and short cycles. The module 200 is self-balancing for long life. Specifically, the parallel combinations help provide the cell-to-cell balancing that is desired for long life, ensuring that no single ultra-capacitor cell 342 is subjected to an overcharge voltage.

The power module 200 combines the feature of long term energy storage provided by the gel cell battery 350, with the low equivalent series resistance (ESR) offered by the bank of ultra-capacitors 340. This removes the high current starting requirements from the battery 350 directly, which in turn enables a longer life. The hybrid power module 200 enables multiple starting attempts for a vehicle battery 102 on a single charge.

The power module 200 is well suited to re-start engines that have been sitting idle for extended periods, such as when a boat has been in dry dock over the winter or a motorcycle has been in storage for an extended period. Portability is enhanced by light weight. In this regard, the power module 200 weighs approximately half of a traditional absorbed glass mat (AGM) or wet cell battery. The power module 200 enables multiple starting attempts on a single charge.

It will be appreciated that the inventions are susceptible to modification, variation and change without departing from the spirit thereof. For example, the power module 200 has been described herein in the context of starting a combustion engine for a vehicle. However, the invention has equal application to starting combustion engines associated with Gen-Sets, boats, RV's, ATV's, motorcycles, water pumps and jet skis.

What is claimed is:

1. A portable hybrid power module, comprising:
   a housing;
   a power module battery residing within the housing, with the power module battery having a positive electrode and a negative electrode;
   an ultra-capacitor also residing within the housing and in electrical communication with the power module battery, wherein the ultra-capacitor is connected in parallel with the power module battery;
   a first device terminal and a second device terminal each associated with the housing, with the first device terminal and the second device terminal being configured to be placed in electrical communication with a battery for an external portable device for charge support; and
   a trickle charger configured to be connected to the first device terminal and the second device terminal external to the housing to provide maintenance charge to the power module battery and to the ultra-capacitor when the trickle charger is plugged into a power source, and wherein:
   the trickle charger does not have a micro-processor; and
   the portable hybrid power module resides on a service vehicle apart from the external portable device.

2. The portable hybrid power module of claim 1, wherein the external portable device is an all-terrain vehicle, a personal water craft, or a vehicle.

3. The portable hybrid power module of claim 2, wherein the vehicle is a class-07 or class-08 truck.

4. The portable hybrid power module of claim 2, wherein the vehicle is an electric vehicle.

5. The portable hybrid power module of claim 2, wherein the external portable device is a generator set.

6. The portable hybrid power module of claim 2, wherein:
   the power module battery is connected between the first device terminal and the second device terminal; and
   the ultra-capacitor comprises a bank of individual super capacitors placed in series.

7. The portable hybrid power module of claim 6, wherein:
   the power module battery is a gel cell battery; and
   the bank of super capacitors comprises six to twelve super capacitors placed in series.

8. The portable hybrid power module of claim 7, wherein the service vehicle comprises a hand truck, an electric cart, or an over-the-road service vehicle.

9. The portable hybrid power module of claim 8, wherein a Zener diode clamp is placed across each individual super capacitor, forming an active voltage balance circuit.

10. The portable hybrid power module of claim 9, further comprising:
    a first rectifier connected between the first device terminal and the bank of super capacitors, with the rectifier being configured to provide unidirectional current flow from the first device terminal to the bank of super capacitors.

11. The portable hybrid power module of claim 10, wherein:
    the power module further comprises a third device terminal; and
    a second rectifier is connected between the third device terminal and the ultra-capacitor.

12. The portable hybrid power module of claim 7, wherein each of the first device terminal and the second device terminal represents a standard SAE terminal.

13. The portable hybrid power module of claim 12, wherein:
    the gel cell battery is a 12 volt DC battery; and
    each of the super capacitors generates 2.5 volt DC current.

* * * * *